United States Patent [19]

Cimmino et al.

[11] Patent Number: 5,090,248
[45] Date of Patent: Feb. 25, 1992

[54] ELECTRONIC TRANSDUCER

[75] Inventors: Alberto F. Cimmino, East Brighton; Anthony G. Klein, Kew; Geoffrey I. Opat, Malvern, all of Australia

[73] Assignee: The University of Melbourne, Victoria, Australia

[21] Appl. No.: 467,916

[22] Filed: Jan. 22, 1990

[30] Foreign Application Priority Data

Jan. 23, 1989 [AU] Australia .................. PJ2378

[51] Int. Cl.⁵ .............................................. G01B 7/16
[52] U.S. Cl. ..................................................... 73/780
[58] Field of Search .................. 73/774, 778, 779, 780, 73/862.68, 862.64; 33/783, 784, 787, 788, DIG. 13; 361/280, 283; 324/661–663, 671, 674, 675, 681, 682

[56] References Cited

U.S. PATENT DOCUMENTS

| | | | |
|---|---|---|---|
| 2,564,416 | 8/1951 | Wildhack | 73/774 |
| 3,678,378 | 7/1972 | Trott et al. | 73/780 |
| 3,826,861 | 7/1974 | Karl et al. | 174/84 C |
| 4,386,386 | 5/1983 | Akita | 73/862.64 |
| 4,761,073 | 8/1988 | Meltz et al. | 73/800 |

FOREIGN PATENT DOCUMENTS

1201308 8/1970 United Kingdom .

*Primary Examiner*—Robert Raevis
*Attorney, Agent, or Firm*—Sheridan, Ross & McIntosh

[57] ABSTRACT

An extensometer for measuring dimensional change comprises a pair of adjacent conductors (10) helically wound to form a bifilar one layer coil so as to have substantial elastic deformation. The coil is embedded in dielectric material (13) capable of similar elastic deformation whereby the extensometer has a large dynamic range. Elongation or deformations of the extensometer cause a change in electrical capacitance between the conductors which change in capacitance is monitored to measure the elongation or deformation. The conductors may have a rectangular cross-section with rounded corners to improve linearity of the graph of capacitance versus elongation. The extensometer has a length which is at least an order of magnitude greater than the cross-sectional dimension thereof. A method of constructing the extensometer includes forming the coil on a mandrel (11) removing the mandrel and immersing the coil in a container of liquid dielectric material until the liquid cures.

5 Claims, 3 Drawing Sheets

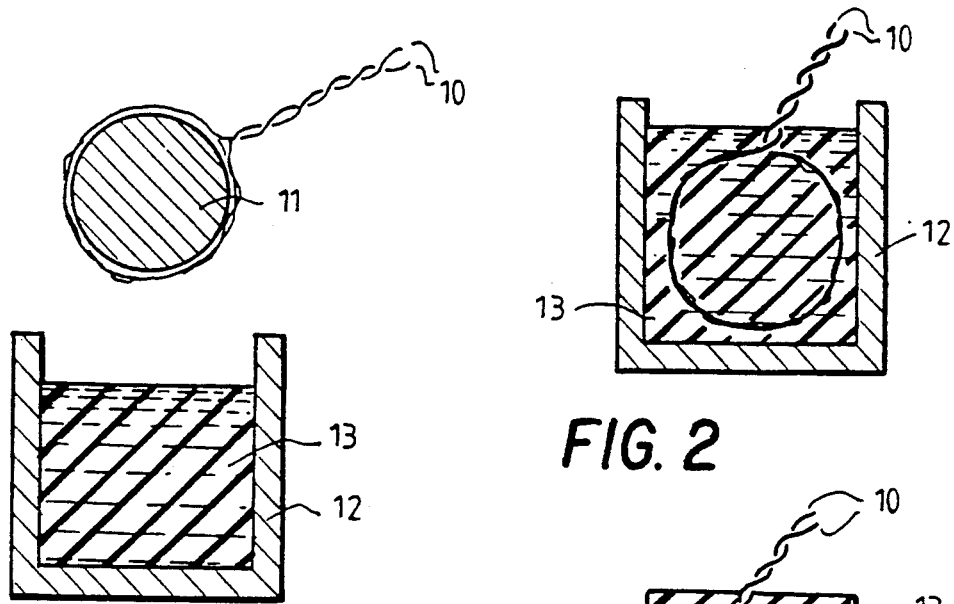
FIG. 1
FIG. 2
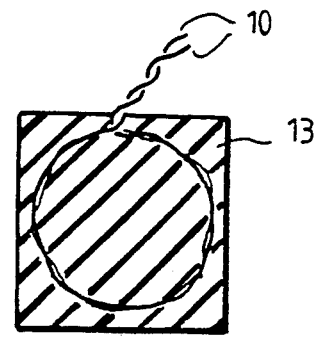
FIG. 3
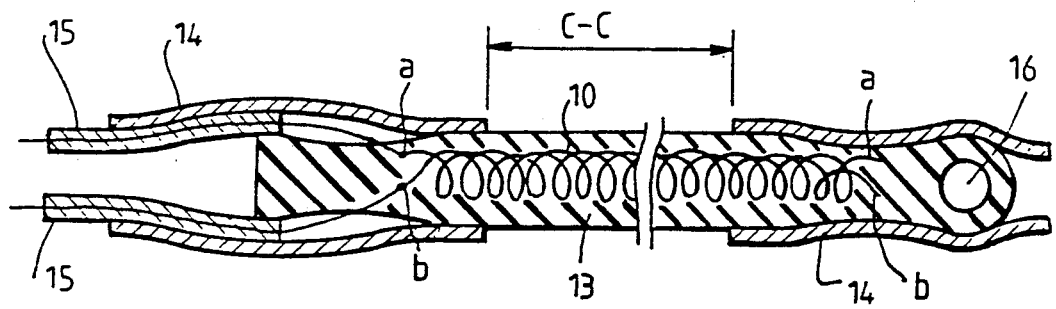
FIG. 4a
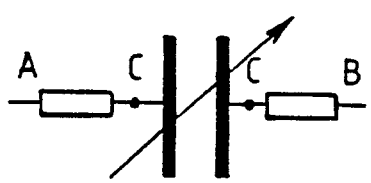
FIG. 4b
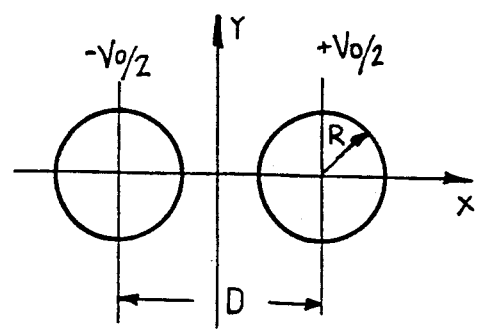
FIG. 5

ELECTRONIC TRANSDUCER

FIELD OF THE INVENTION

The present invention relates to a transducer and, more particularly, to an electronic transducer in the form of an extensometer having a wide dynamic range and suitable for measuring large and small displacements such as elongation of objects; the change in distance between two points in space; the elongation of a curved arc over a surface and, in general, changes in any other single length dimension.

As opposed to conventional strain gauges, the extensometer of the present invention is capable of measuring a very wide-range strain, elongation or displacement. A conventional strain gauge of the kind which relies on the change in length and cross-sectional area of an electrical resistance wire and measurement of the change in resistance thereof, facilitates measurement of only small strains. This limitation on the amount of strain which can be measured is brought about by the elasticity of the conductor which extends, in the case of conventional conductors, over only a small range. Thus, whilst such conventional strain gauges facilitate accurate measurement of very small deformations, they do not facilitate measurement of large deformations, that is, where the final configuration of an article exceeds the initial configuration by a large factor.

SUMMARY OF THE INVENTION

Thus, it is an object of this invention to provide an extensometer which facilitates electronic measurement of large displacements of objects relative to the displacements which can be measured using conventional strain gauges.

Accordingly, the invention provides an extensometer for measuring dimensional change, said extensometer comprising two or more adjacent electrical conductors configured to allow elastic deformation thereof to cause a change in electrical interaction between said conductors, characterized in that, said conductors are in the form of interposed helical coils which facilitate large and small elongations or deformations of said extensometer to provide a wide dynamic range.

In a further aspect, the invention provides a method of producing an extensometer of the kind defined in the preceding paragraph characterized in that, a pair of conductors are wound as a bifilar one-layer coil over a mandrel to form an elongate helical coil, said mandrel is withdrawn and said coil is either embedded in dielectric material having substantial elasticity or coated with said dielectric material.

DESCRIPTION OF DRAWINGS

In order that the invention may be more readily understood, a particular embodiment will now be described with reference to the accompanying drawings wherein:

FIG. 1 is a sectional end view of a transducer according to the invention in an early stage of construction, FIG. 2 is a view similar to FIG. 1 showing the next stage construction, FIG. 3 is a view similar to FIGS. and 2 showing the next stage of construction, FIG. 4(a) is a sectional side elevation of the transducer of FIGS. 1-3 in a further stage of construction, FIG. 4(b) is the equivalent circuit of the transducer of FIG. 4(a), FIG. 5 is a theoretical sectional view of the wires of the transducer for the purpose of theoretical discussion.

DETAILED DESCRIPTION

Figure 6:
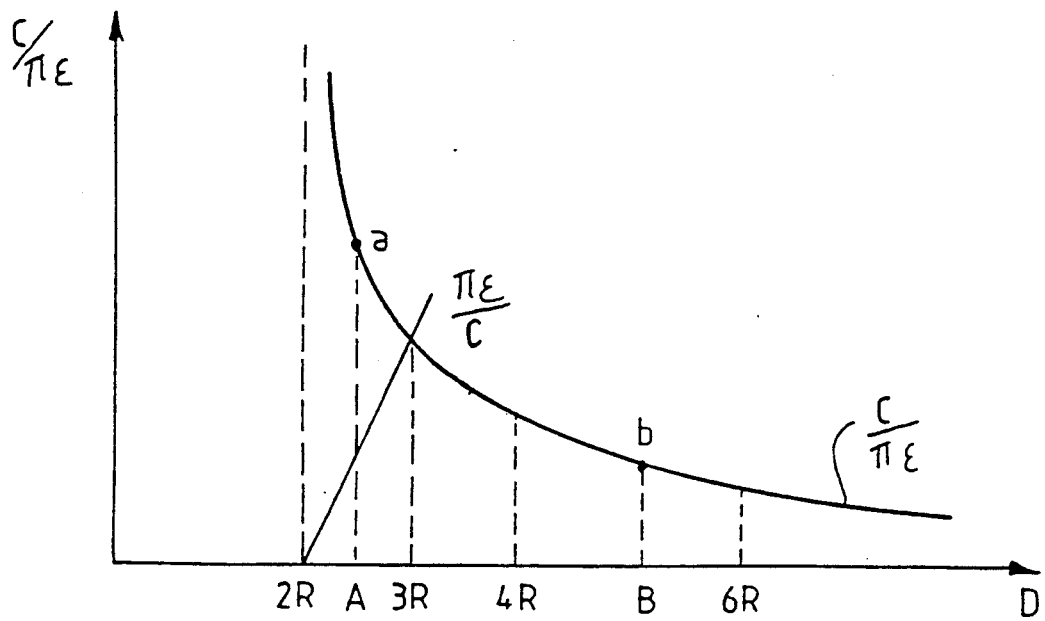
FIG. 6 is a graph of capacitance versus wire separation for the purpose of the theoretical discussion.

The transducer according to the present embodiment consists of a pair of insulated copper wires 10 which are wound as a bifilar one-layer coil over a mandrel 11 of suitable size. According to the present embodiment, the following parameters apply:

Wire gauge No. 36 enamelled copper wire;
Mandrel diameter 2.5 mm;
coil length 200 mm.

The double helix coil is tightly wound around the mandrel with the wires closely adjacent and, upon release of the ends, the finished coil unwinds to a diameter of about 2.7 mm, facilitating the removal of the mandrel. A container 12 in the form of an aluminum channel of square cross-section of 4 mm sides, is filled with Dow Corning Silastic E RTV silicon rubber, in liquid form prepared according to the manufacturer's specification. The coil is positioned above the container and the mandrel removed so that the coil sinks into the Silastic.

After allowing for curing of the Silastic 13, the transducer is removed from the container 12. The Silastic provides a solid elongate block of elastic material encasing the coil. Insulated wires 15 are attached to the respective helices at one end. The other ends of the helices are left open circuit inside the Silastic.

As is evident in FIG. 4(a), the Silastic mould extends past the double helix and heat shrinking sleeves 14 are attached to the ends of the cured Silastic by heat shrinking over said Silastic to provide a convenient way of securing the transducer to a body (not shown) which is subject to elongation or for connection to a test rig (not shown) for performance characterization and monitoring. In some instances, eyelets such as the eyelet 16 are embedded in the transducer ends. The heat shrinking sleeves 14 provide a rigid termination on the transducer ends, so that elongation is attained only over the sensitive part of the transducer represented by the length C-C in FIG. 4(a). FIG. 4(b) shows the electrical circuit equivalent of the transducer where the length C-C is the effective transducer length and the overall length A-B includes the sleeves 14.

It will be evident that the transducer comprises a pair of separate insulated wires 10 which are capable of being connected to a monitoring circuit, as will be described hereinbelow, for the purpose of measuring an electrical parameter such as capacitance, therebetween.

The theory governing the operation of the transducer is as follows. Considering a simple electrode system consisting of two parallel wires of circular cross-section of radius R with centre to centre spacing D (FIG. 5) for infinitely long wires, the analytical expression for the capacitance per unit length is given by $$C = \frac{q}{V_o} = \frac{\pi\epsilon}{\cosh^{-1}(D/2R)} \text{ (farads/meter)}$$

where
q is the charge,
$V_o/2$ is the potential for each electrode
$\epsilon$ is the dielectrode constant of the surrounding medium.

A graph of the capacitance versus wire separation D is shown in FIG. 6.

An analytical expression for the capacitance of a double helix electrode system is not available, and approximations have to be used depending upon the parameters of the helix. In general, the behaviour will be similar to that shown above. For small relative displacements, the above formula gives the expression $$C \simeq \frac{\epsilon k}{D}$$

which is the same form as for a simple plain parallel capacitor of area k and separation D. If we plot the inverse of capacitance as a function of D, we obtain a straight line.

Figure 7:
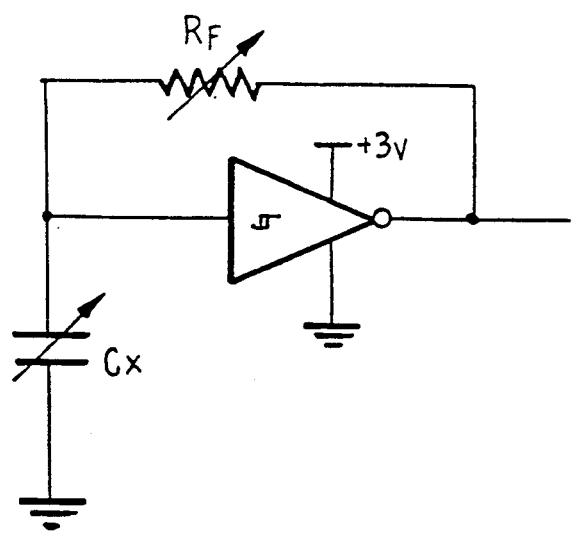
FIG. 7 is a simplified circuit diagram for measuring capacitance between the wires of the transducer.
Figure 8:
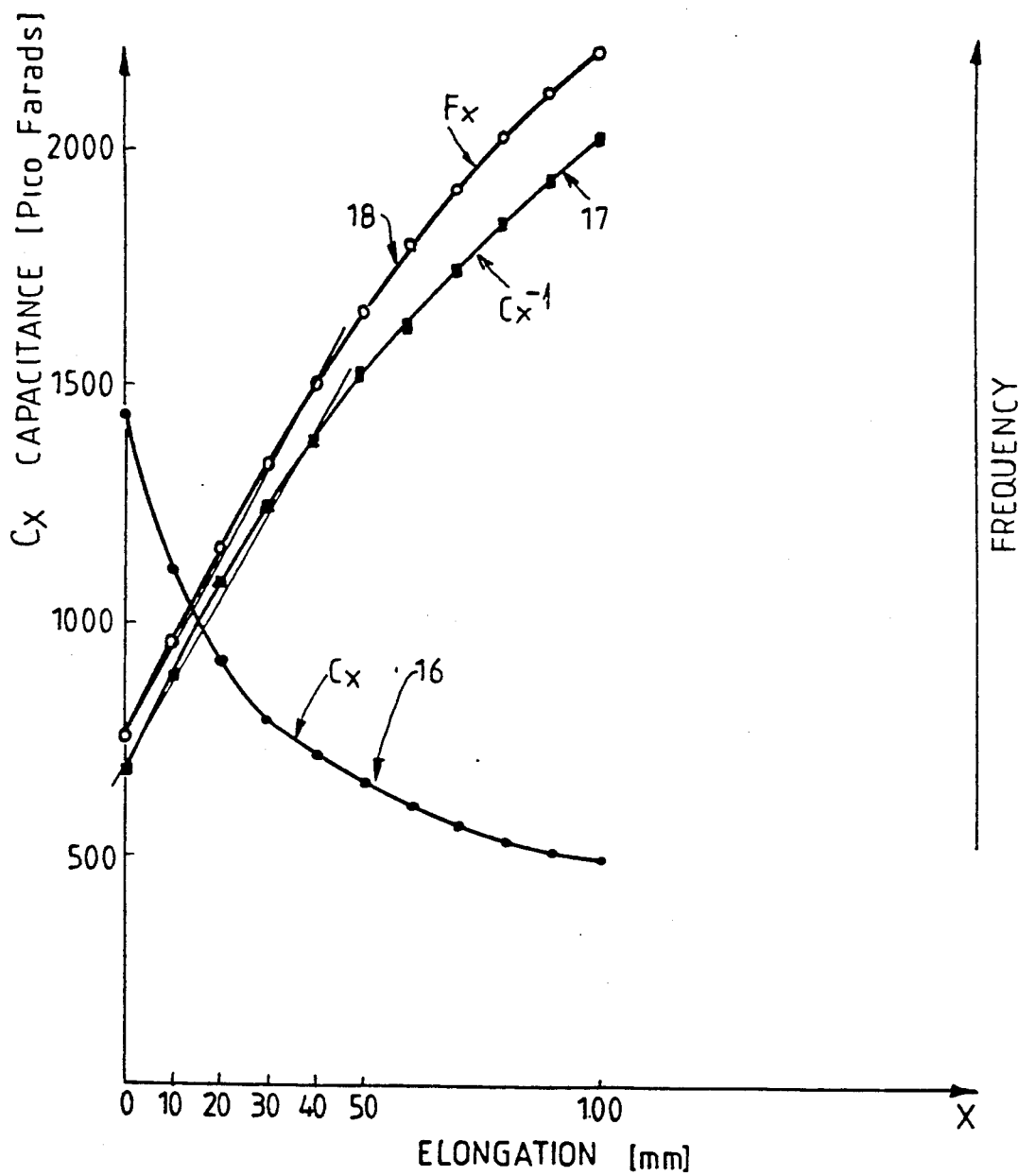
FIG. 8 is a graph of capacitance versus elongation for experimental results using the transducer of this embodiment.

Experimental data for the transducer of the present embodiment is shown in graphic form in FIG. 8 which is a plot of capacitance (pico farads) versus elongation (mm). The curve 16 shows experimentally measured capacitance as a function of elongation for the transducer, which as stated before, has a helix diameter of 2.7 mm and an effective (active) length of 200 mm. This is to be compared with the graph of FIG. 6 which relates to the theoretical model shown in FIG. 5 in the region between points A and B on the horizontal axis. Curve 17 is a plot of the inverse of the capacitance as given by curve 16 as a function of elongation, and curve 18 is the measured frequency of the signal output of the circuit shown in FIG. 7 as a function of elongation (arbitrary scale) where $C_x$ is the transducer's capacitance. In FIG. 7 the active element is CMOS Schmidt trigger gate type 74C14.

The frequency of output signal, $$F_x = H/R_f C_x$$

where
H is a circuit constant and
$R_f$ sets the operating centre frequency.

From the plot, the linear behaviour of $F_x$ as a function of transducer elongation X, (simply related to coil separation D) for a range of 25% elongation is evident. Standard signal processing techniques enable a linear output over a range extending beyond 50% elongation.

In a modification to the above embodiment (not shown in the drawings) the cross-sectional shape of the wires 10 is flattened whereby they have a more rectangular cross-sectional shape with curved corners. The result is that the plot of capacitance versus elongation is linear or almost linear over a greater range of elongations than for the graph shown in FIG. 8 as is the plot of frequency as a function of elongation. In this modification, the circuit constant H is much larger than for wires of circular cross-section giving rise to increased sensitivity of the extensometer.

According to a further embodiment (not shown in the drawings), the solid block of Silastic is eliminated since in many applications, particularly in the biomedical field, it is unnecessary. In this further embodiment, the formed helical coil is painted over with a coating of the same Silastic material, or a similar material, in order to provide the restoring force. If the conductors of the coil are formed of springy material having sufficient elasticity when wound into a bifilar helical coil, then the coating of Silastic may be eliminated altogether.

In the event that the extensometer is to be affixed to the finger of a glove, for example, to measure or monitor movement of a patient's finger, a layer of Silastic or like material may be provided along the finger of the glove, the coil laid thereon before curing and a further layer painted over the coil. After curing, the coil is elastically affixed to the glove.

It should be evident from the description hereinabove that the invention facilitates measuring displacements or elongations or dilatations or torsions, where the size of the final configuration may exceed the initial one by a large factor. Whilst the invention was originally devised to provide non-invasive monitoring of physiological changes in human bodies, it is applicable, in general, in any situation which involves the monitoring of dimensional changes. Whilst the preferred embodiment shows a transducer comprising a double helix arrangement, it will be clear to persons skilled in the art that many other configurations of the electrical conductors may be utilized since it is only necessary that the particular construction enable substantial elongation of the conductors relative to their initial length whereby an electrical characteristic is altered as the conductor is extended or contracted.

It should be further noted that whilst the extensometer of the invention has a very wide dynamic range it is also able to monitor very small displacements. In one example wherein the extensometer is used in a biomedical application to monitor chest expansion and contraction, so as to monitor breathing, it is at the same time able to monitor the minute pulsations caused by heartbeat of the user. This is an example of the wide dynamic range and sensitivity of the extensometer.

It should be evident that it is a change in separation of the conductors which results from a change in the pitch of the helix as the transducer is stretched, which results in the change in capacitance.

The transducer may be manufactured in a continuous length and cut to size to fit particular applications. This constitutes a net advantage over prior art such as, for example, mercury-filled strain gauges which have to be made in a range of sizes to accommodate different requirements.

It should be evident from the description hereinabove that the present invention provides an extensometer which has many and varied applications. Some examples are set forth below.

(a) Biomedical applications, such as studies of changes of body shape and dimension for clinical, diagnostic or research purposes.
(b) Mechanical applications, such as wide-range motion indication, e.g. in dynamometers.
(c) Sports and exercise machinery - motion readout for measuring work output.
(d) Other applications in geo-mechanics, agricultural research, etc.
(e) A combination of the above wherein the remote manipulation of real or computer simulated objects can be achieved by monitoring several extensometers attached to gloves, vests, etc.

In summary, the invention provides an extensometer which is easily fabricated and has a high sensitivity and wide dynamic range.

The claims defining the invention are as follows:

1. An extensometer for measuring dimensional change, said extensometer comprising two or more adjacent electrical conductors selected and configured to allow relative positioning changes thereof to cause a change in electrical interaction between said conductors, wherein said conductors are thin, pliable, electrically conductive wires wound in the form of interposed helical coils, said coils including at least two adjacent turns that are completely encased in an elastic dielectric material as a principal means for restoring said wires to their original configuration after a positioning change thereof, wherein said configured electrically conductive wires and said restorative elastic material combinatively facilitate arcuate conformability during use and accurate measurement of small and substantial displacements, extensions, dilation, and torsions about a longitudinal extent of the extensometer.

2. An extensometer, as defined in claim 1, wherein said electrical interaction is the capacitance between said conductors.

3. An extensometer, as defined in claim 1, wherein insulated wires are connected to said conductors at one end of the extensometer to facilitate measurement of said electrical interaction.

4. An extensometer, as defined in claim 1, wherein said extensometer is long and thin, wherein a length thereof is at least an order of magnitude greater than a diameter of said helical coils.

5. An extensometer for measuring dimensional change, said extensometer comprising two or more adjacent electrical conductors selected and configured to allow relative positioning changes thereof to cause a change in electrical interaction between said conductors, wherein said conductors are thin, pliable, electrically conductive wires having a cross-sectional shape in the form of a rectangle with curved corners wound in the form of interposed helical coils, said coils including at least two adjacent turns that are completely encased in an elastic dielectric material as a principal means for restoring said wires to their original configuration after a positioning change thereof, wherein said configured electrically conductive wires and said restorative elastic material combinatively facilitate arcuate conformability during use and accurate measurement of small and substantial displacements, extensions, dilations, and torsions about a longitudinal extent of the extensometer.

* * * * *